United States Patent [19]
Luethi et al.

[11] 3,900,443

[45] Aug. 19, 1975

[54] TRIAZINE DERIVATIVES

[75] Inventors: Christian Luethi, Muenchenstein; Hans Rudolf Biland, Gelterkinden; Max Duennenberger, Frenkendorf, all of Switzerland

[73] Assignee: Ciba-Geigy Corporation, Ardsley, N.Y.

[22] Filed: Nov. 14, 1973

[21] Appl. No.: 415,715

Related U.S. Application Data

[62] Division of Ser. No. 156,541, June 24, 1971, abandoned.

[30] Foreign Application Priority Data

June 30, 1970 Switzerland.......................... 9877/70

[52] U.S. Cl..................... 260/45.8 NT; 260/248 CS

[51] Int. Cl. ........................................... C08f 45/58
[58] Field of Search............................. 260/45.8 NT

[56] References Cited
UNITED STATES PATENTS

| | | | |
|---|---|---|---|
| 3,011,998 | 12/1961 | D'Alelio........................... | 260/249.5 |
| 3,210,350 | 10/1965 | D'Alelio........................... | 260/249.5 |

*Primary Examiner*—Melvyn I. Marquis
*Attorney, Agent, or Firm*—Nester W. Shust

[57] ABSTRACT

New 1,3,5-triazinyl-(6)-phosphonates are used as antioxydants for organic materials. They are prepared by reacting a corresponding 1,3,5-triazinyl-(6)-halogenide with a corresponding phosphonate.

10 Claims, No Drawings

TRIAZINE DERIVATIVES

This application is a division of application Ser. No. 156,541, filed June 24, 1971, now abandoned.

DETAILED DESCRIPTION

The triazine derivatives according to the invention correspond to the formula:

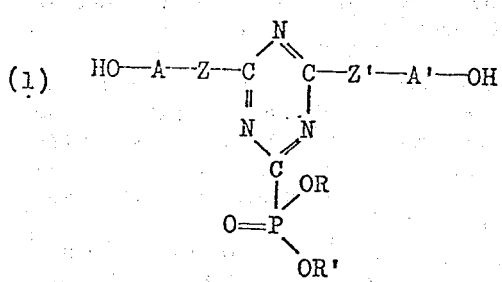

(1)

wherein A and A' are identical or different, and each represent an optionally substituted phenylene radical which is bound in position 1 to Z or to Z' and carries in position 4 a hydroxyl group; Z and Z' are identical or different and represent a bridging member —O—, —S— or —NQ—, with Q standing for hydrogen, alkyl, alkoxy, or —CN; R and R' are identical or different and each represent an optionally substituted alkyl, cycloalkyl or phenyl radical.

Suitable substituents on the phenylene radicals are, in the first place, alkyl or cycloalkyl, whereby by the term alkyl is meant both branched and unbranched alkyl.

Of predominant interest are triazine derivatives of the formula:

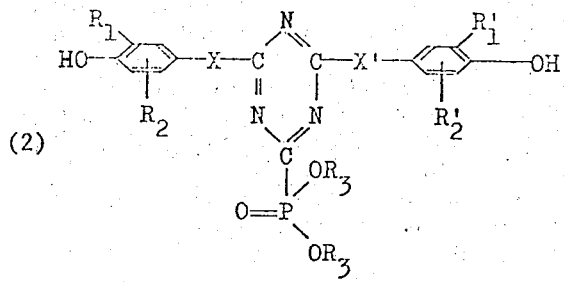

(2)

wherein $R_1$ and $R_1'$ are identical or different and represent an alkyl group having 1 to 8 carbon atoms; $R_2$ and $R_2'$ are identical or different and represent hydrogen or an alkyl group having 1 to 8 carbon atoms; $R_3$ represent an alkyl group having 1 to 18 carbon atoms, or a phenyl group; and X and X' are identical or different and represent a bridging member —O— or —NH—.

The substituents $R_2$ and $R_2'$ are thereby preferably in the m- or p-position to $R_1$ and $R_1'$.

Emphasis is to be placed, in particular, on the symmetrically substituted triazines of formula (2), i.e., such having two identical substituents on the triazine ring, such as the compounds of the formulae:

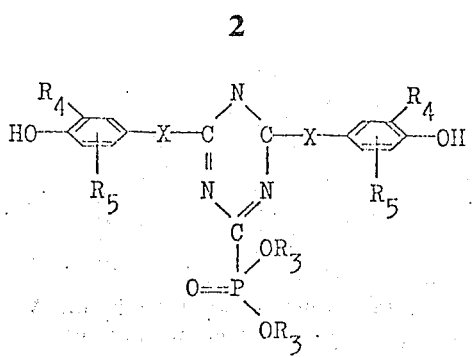

(3)

wherein $R_4$ represents an alkyl group having 1 to 4 carbon atoms, and $R_5$ represents hydrogen or an alkyl group having 1 to 4 carbon atoms, and $R_3$ and X have the given meaning; the compounds of the formula:

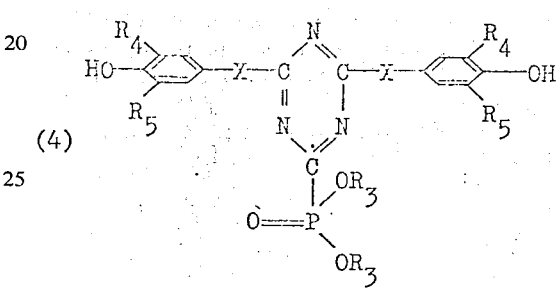

(4)

wherein $R_3$, $R_4$, $R_5$ and X have the given meaning; the compounds of the formula:

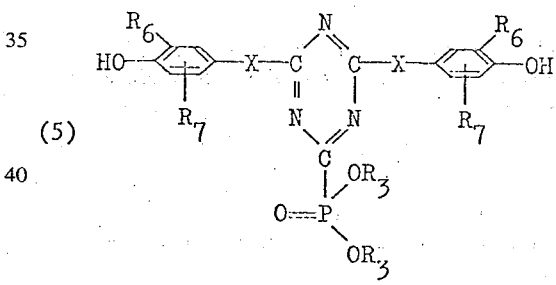

(5)

wherein $R_6$ represents a branched alkyl radical having 3 or 4 carbon atoms, and $R_7$ represents hydrogen, methyl, or a branched alkyl radical having 3 or 4 carbon atoms, and $R_3$ and X have the given meaning; and the compounds of the formula:

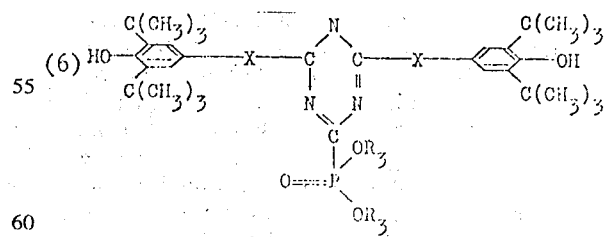

(6)

wherein X and $R_3$ have the given meaning. In these formulae $R_3$ preferably represents a straight-chain alkyl group having 1 to 18, especially 1 to 4, carbon atoms.

The compounds of formula (1) are advantageously produced by the reaction of a compound of the formula:

(7) 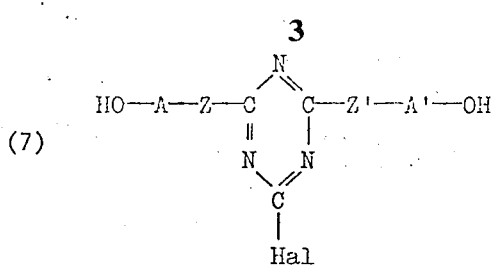

wherein Hal represents a halogen atom, and A, A', Z and Z' have the given meaning, with a compound of the formula:

(8) 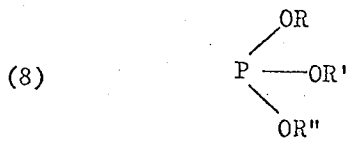

wherein R and R' have the given meaning, and R'' is equal to or different from R and R', and represents an optionally substituted alkyl, cycloalkyl, or phenyl radical.

The triazine derivatives of formula (2) are produced by the reaction of a compound of the formula:

(9) 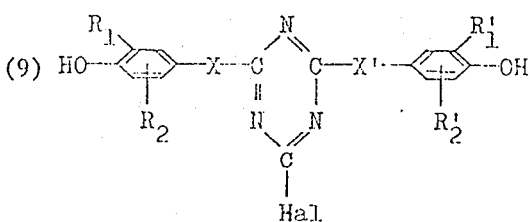

wherein Hal represents a halogen atom, and $R_1$, $R_1'$, $R_2$, $R_2'$, X and X' have the given meaning, with a phosphite of the formula $$P(OR_3)_3$$
(10)

wherein $R_3$ has the given meaning.

In the formulae (7) and (9), halogen is preferably chlorine.

The reaction can be performed in a solvent or solvent mixture inert to the reactants. Suitable solvents are, e.g.: dichlorobenzene, trichlorobenzene, perchloroethylene, diethylene glycol dialkyl ether, p-cymol Preferably, however, the reaction is performed in the melt, whereby it is advantageous for the operation to be carried out in an inert atmosphere, e.g. under nitrogen. The reaction is thereby performed between 40° and 220°C, preferably between 100° and 200°C, whereby the reaction duration can be from several minutes to several hours, generally it is from half an hour to 5 hours. The duration of the reaction depends mainly on the chosen reaction temperature. On the other hand, the reaction duration depends also on the extent to which the halide formed during the reaction, generally a chloride, is removed from the reaction mixture to effect the displacement of the equilibrium in favour of the triazine derivatives according to the invention. For the purpose of removal of the halide by means of distillation, the reaction is hence advantageously performed (particularly if higher-molecular halides are formed) under reduced pressure. Any solvent present thereby simultaneously distills off, so that the compounds according to the invention remain behind, after completion of the reaction, direct in a more or less pure state.

The monohalogen triazines to be used as starting materials for the present process are accessible in a manner known per se, e.g., as described in the U.S. Pat. No. 3,255,191.

The described new compounds constitute valuable antioxidants, i.e., they are suitable for the stabilisation of organic materials to oxidative decomposition, by which is meant, in particular, thermally accelerated oxidations. Examples of materials which can be protected are:

1. Polymers derived from singly or doubly saturated hydrocarbons, such as polyethylene which can be optionally cross-linked, polypropylene, polyisobutylene, polymethylenebutene-1, polymethylpentene-1, polybutene-1, polyisoprene, polybutadiene, polystyrene, polyisobutylene;

copolymers of the monomers on which the mentioned homopolymers are based, such as ethylene-propylene-copolymers, propylenebutene-1-copolymers, propylene-isobutylene-copolymers, styrene-butadiene-copolymers, as well as terpolymers of ethylene and propylene with a diene, such as, e.g., hexadiene, dicyclopentadiene or ethylidenenorbonenes; mixtures of the above stated homopolymers such as, e.g., mixtures of polypropylene and polyethylene, polypropylene and poly-butene-1, polypropylene and polyisobutylene.

2. Halogen-containing vinylpolymers such as polyvinyl chloride, polyvinylidene chloride, polyvinyl fluoride, also polychloroprene and chlorinated rubbers.

3. Polymers derived from $\alpha,\beta$-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylic ester copolymerisates.

4. Polymers derived from unsaturated alcohols and amines on their aryl derivatives or acetals, such as polyvinyl alcohol, polyvinylacetate, -stearate, -benzoate, -maleate, polyvinylbutyral, polyallylphthalate, polyallylmelamine and copolymers thereof with other vinyl compounds, such as ethylene/vinylacetate copolymers.

5. Homo- and copolymers derived from epoxides, such as polyethylene oxide or the polymerisates derived from bisglycidyl ethers.

6. Polyacetals, such as polyoxymethylene and polyoxyethylene, as well as such polyoxymethylenes which contain as comonomer ethylene oxide.

7. Polyphenylene oxides.

8. Polyurethanes and polyureas.

9. Polycarbonates.

10. Polysulphones.

11. Polyamides and copolyamides derived from diamines and dicarboxylic acids and/or from aminocarboxylic acids or from the corresponding lactams, such as polyamide 6, polyamide 6/6, polyamide 6/10, polyamide 11, polyamide 12.

12. Polyesters derived from dicarboxylic acids and from dialcohols, and/or from hydroxycarboxylic acids or from the corresponding lactones, such as polyethylene glycol terephthalate, poly-1,4-dimethylolcyclohexaneterephthalate.

13. Cross-linked polymerisates derived from aldehydes on the one hand, and from phenols, ureas and melamines, on the other hand, such as phenolformaldehyde resins, urea-formaldehyde resins and melamine-formaldehyde resins 14. Alkyd resins, such as glycerin-phthalic acid resins and mixtures thereof with melamine-formaldehyde resins.

15. Unsaturated polyester resins derived from co-polyesters of saturated and unsaturated dicarboxylic acids with polyvalent alcohols, as well as vinyl compounds as cross-linking agents, and also their halogen-containing, difficulty combustible modifications.

16. Natural polymers such as cellulose, rubber, proteins, as well as their polymer-modified derivatives, such as cellulose acetates, cellulose propionates and cellulose butyrates, or the cellulose ethers, such as methyl cellulose.

To obtain a good antioxidant effect, an amount of 0.01 to 5%, preferably 0.1 to 2%, relative to the substrate to be protected, of the compounds according to the invention generally suffices. The antioxidants can be incorporated into the materials to be protected either as antioxidants on their own or as mixtures with other additives such as softeners, pigments, agents protecting against light rays (UV-absorbers), further antioxidants, optical brighteners, with or without the aid of solvents.

The good stabilising effect of the new compounds is shown, for example, under accelerated ageing conditions at temperatures of above 100°C. A polypropylene subjected to these conditions and containing an antioxidant exhibits only after a very much longer period of time signs of a discolouration, or of becoming brittle, compared with the time taken for these effects to become apparent in the case of a polypropylene not containing a stabiliser.

In the description and in the examples, the term 'parts' denotes, if not otherwise stated, parts by weight, and percentages are always per cent by weight. The melting points of the new compounds are not corrected.

EXAMPLE 1

11.1 Parts of the compound of the formula:

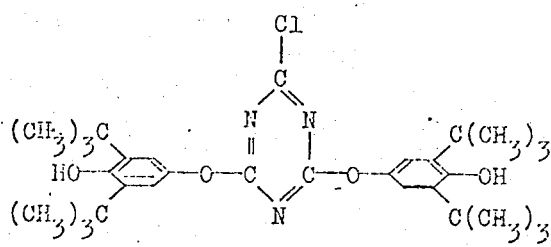

(11)

are heated together with 8.3 parts of triethyl phosphite in a nitrogen atmosphere for 3 hours to 140° to 145°C. The obtained melt is thereupon dissolved in 45 parts of chloroform; to the solution are then added 50 parts of hexane, the whole is concentrated to half the volume, and cooled to 0°C. The thereby precipitated product is filtered off under suction, and washed with hexane. Thus obtained are 11.3 parts of the compound of the formula:

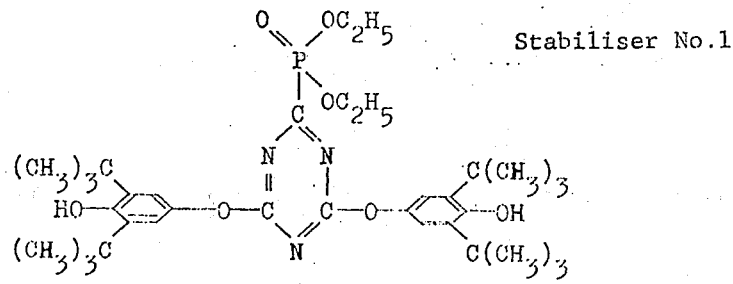

Stabiliser No.1

(12)

Melting point 143°C.

The compound of formula (II) used as starting product and having a melting point of 217° to 219°C is obtained in 86% yield by reaction of 18.5 parts of cyanuric chloride with 44.5 parts of 2,6-di-tert.butyl-hydroquinone in 250 parts of acetone, this being effected by the adding dropwise at 35° to 40°C, in the course of 5 hours, of a solution of 8 parts of sodium hydroxide in 195 parts of water, the addition being made in such a way that the $p_H$-value does not exceed 7. The obtained suspension is thereupon cooled to 0°C, the precipitated product filtered off under suction, washed with water and dried.

In an analogous manner are obtained with use of the compounds of the formulae:

(12)

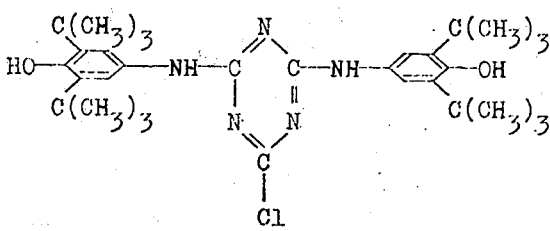

(13) 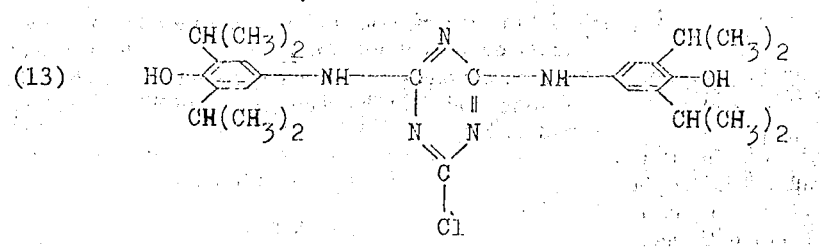
(14) 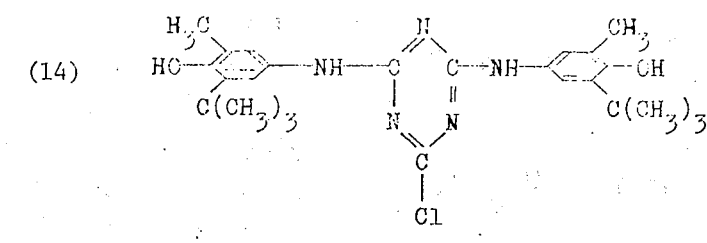
(15) 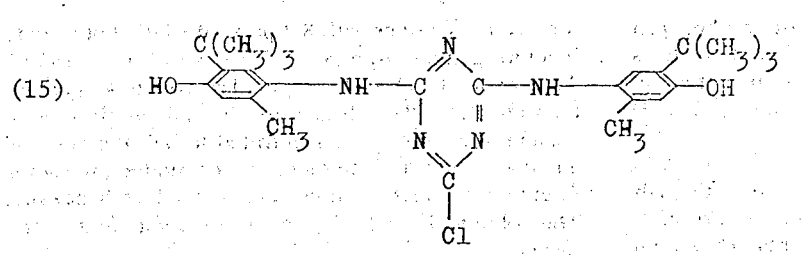
(16) 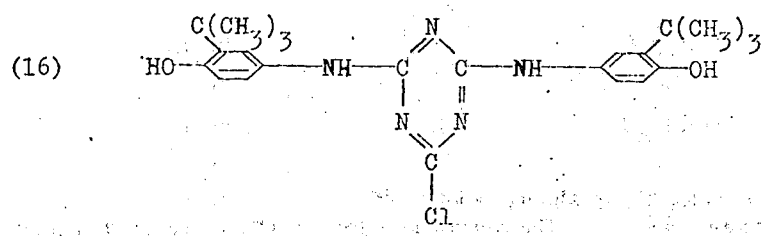
(17) 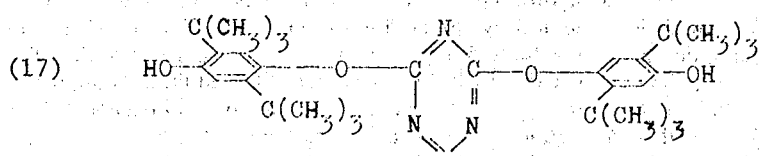
(18)

(19) 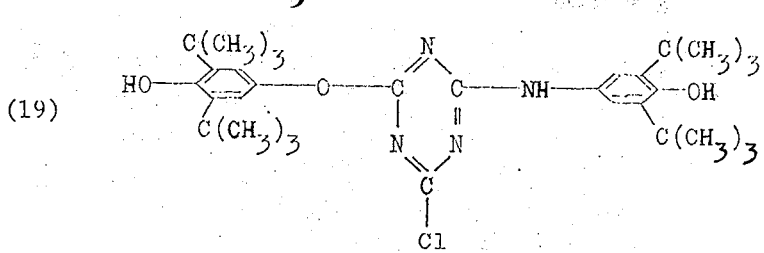
the compounds of the formulae:
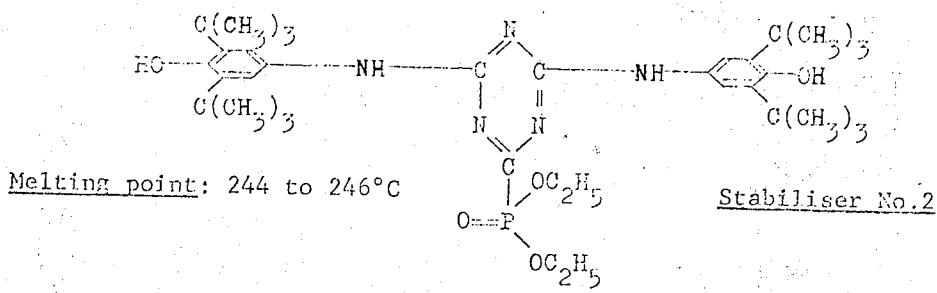
Melting point: 244 to 246°C        Stabiliser No.2
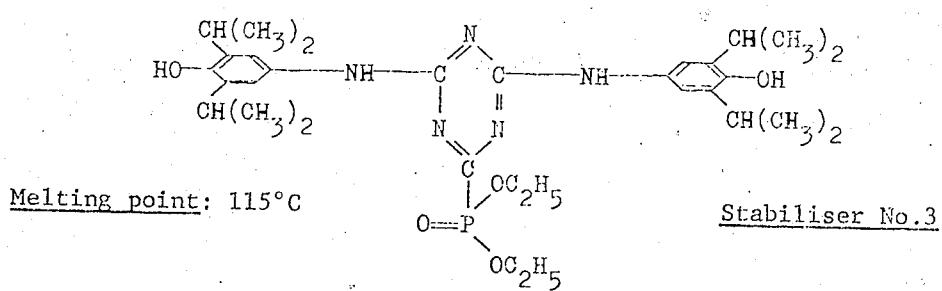
Melting point: 115°C        Stabiliser No.3
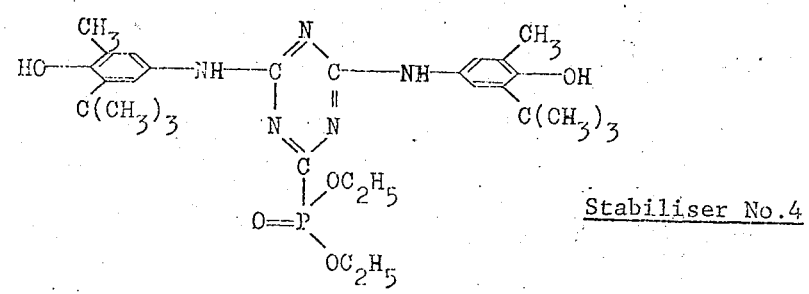
Stabiliser No.4
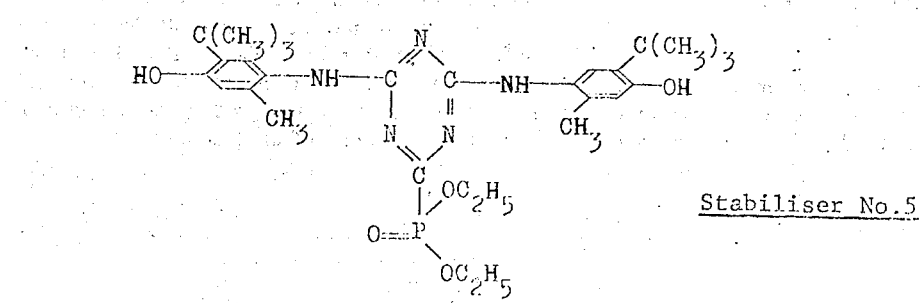
Stabiliser No.5

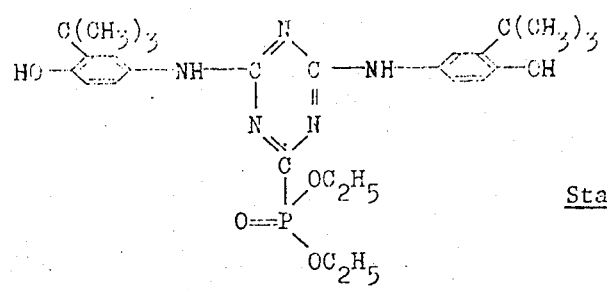

Stabiliser No.6

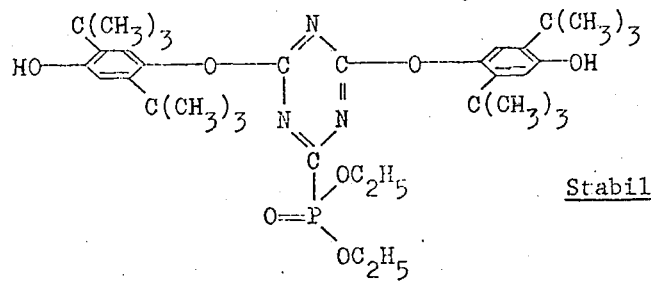

Stabiliser No.7

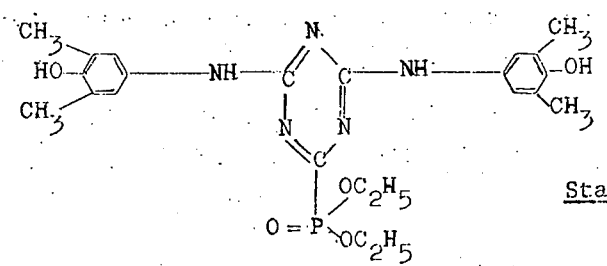

Stabiliser No.8

Melting point 108°
(decomposition)

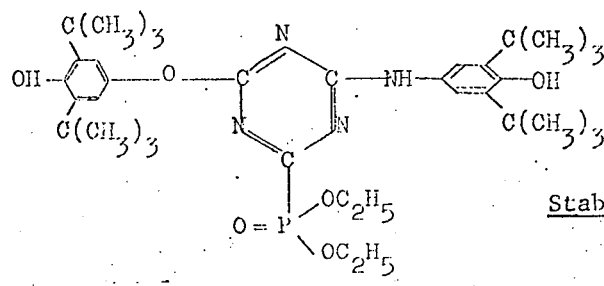

Stabiliser No.9

Melting point up to 212 - 213°C

EXAMPLE 2

5.5 Parts of the compound of formula (11) are melted together with 9.1 parts of trioctadecylphosphite in a nitrogen atmosphere at 50°C. The melt is then heated under vacuum (0.5 Torr) to 180°C, and the formed octadecyl chloride distilled off. The reaction is completed after 30 minutes. Thus obtained are 11 parts of a yellow viscous oil from which is isolated, after chromatography on silica gel and extraction with chloroform, the compound of the formula:

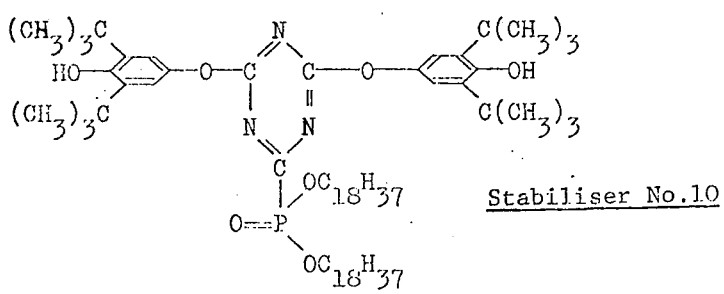

Stabiliser No.10

Melting point after recrystallisation from acetone/water = 40° to 41°C.
In an analogous manner is obtained the compound of the formula:
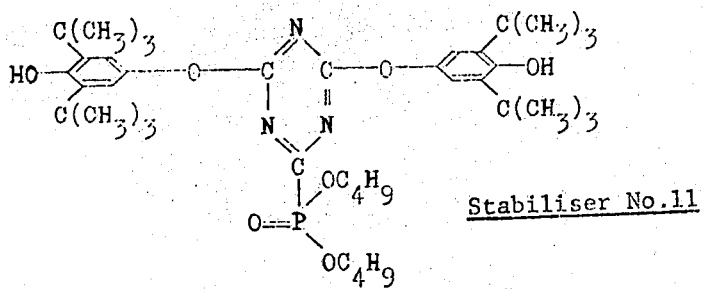
Stabiliser No.11
Melting point 95° to 96°C.
In an analogous manner can be obtained by use of the compounds of formulae (11), (12), (13) and (14) the compounds of the formulae:
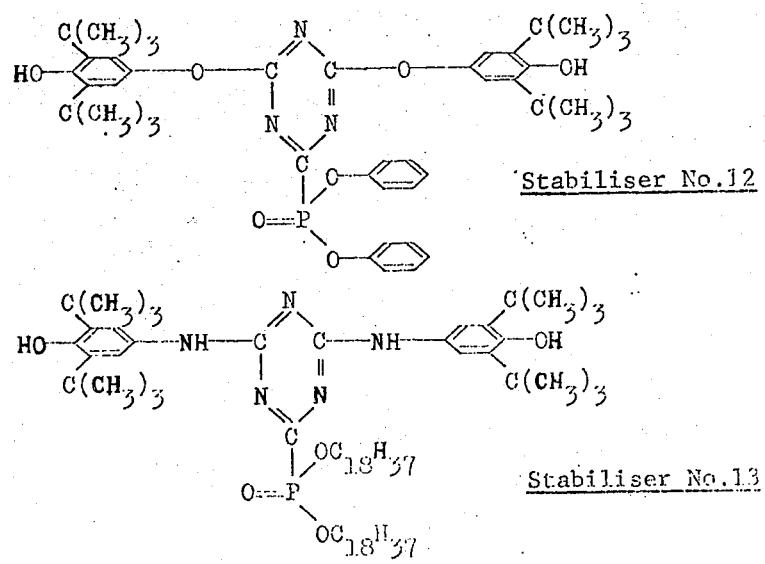
Stabiliser No.12
Stabiliser No.13
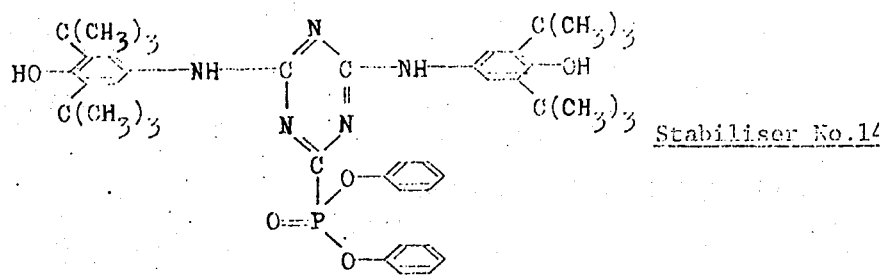
Stabiliser No.14
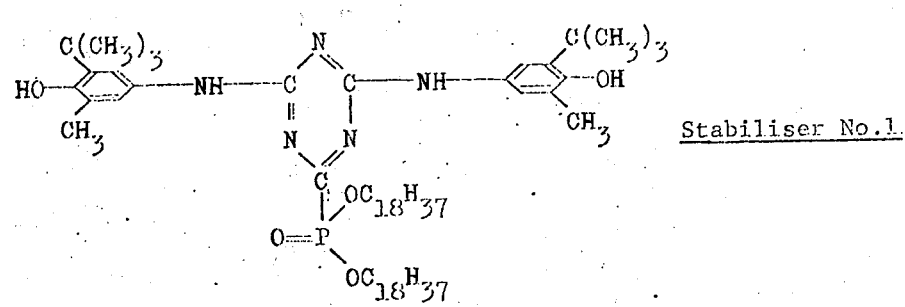
Stabiliser No.1

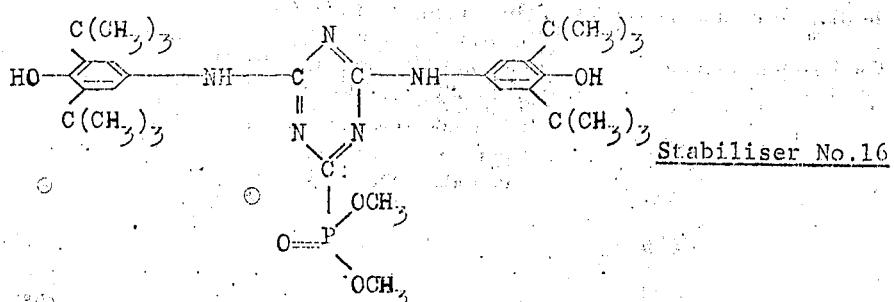
Stabiliser No.16
Melting point: 259° to 260°C
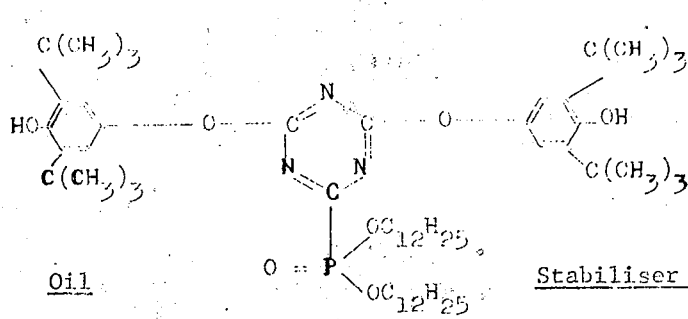
Oil    Stabiliser No.17
Calculated: C 70.40 H 9.88 N 4.48
Found:      70.48  10.06  4.53
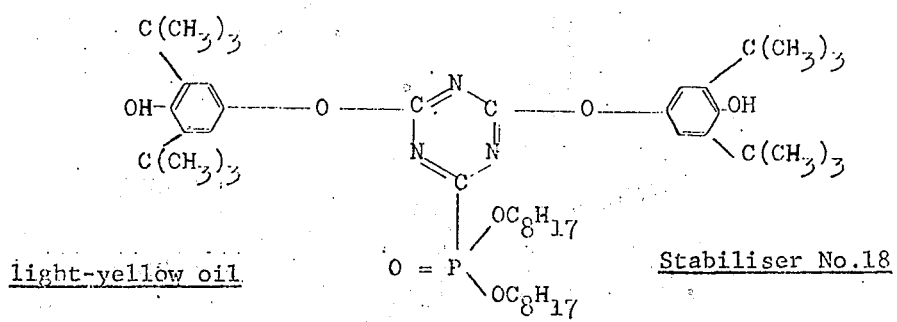
light-yellow oil    Stabiliser No.18
Calculated: C 68.33 H 9.27 N 5.09
Found:      68.06  9.31  5.27
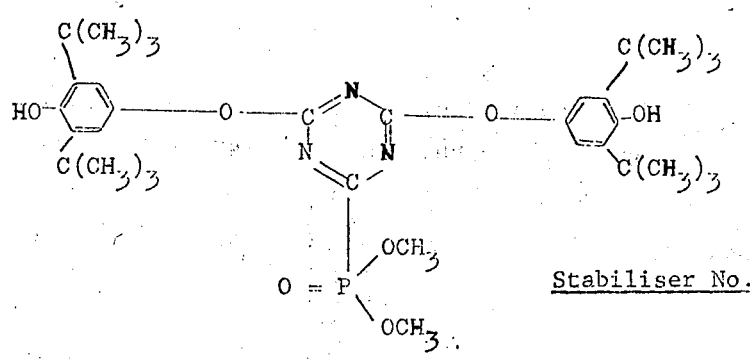
Stabiliser No.19
Melting point 207 - 208°C The following prior known stabilisers were tested as comparison compounds in the application examples:

| | |
|---|---|
| 2,6-di-tert.butyl-4-methylphenol | Stabiliser No.20 |
| methylene-bis-(3-methyl-4-hydroxy-5-tert.butylbenzene) | Stabiliser No.21 |
| thio-bis-(2-methyl-4-hydroxy-5-tert.butylbenzene) | Stabiliser No.22 |
| 2,4-(3,5-di-tert.butyl-4-hydroxy-phenylamino)-6-octylmercapto-1,3,5-triazine | Stabiliser No.23 |
| pentaerythrite-tetrakis-(3-[3,5-di-tert.butyl-4-hydroxyphenyl]-propionate) | Stabiliser No.24 |
| 2-(2'-hydroxy-5'-methylphenyl)-benzotriazole | Stabiliser No.25 |

EXAMPLE 3

A mixture of 100 parts of unstabilised polypropylene (Profax 6501, Hercules Powder) and 0.2 parts of a compound according to Table A given below is processed on a calendering machine at 170°C into a sheet, and this subsequently pressed at 230°C, under a pressure of 40 kg/cm², to form a plate of 1 mm thickness. The thus obtained plates are subjected at 140°C (air, normal pressure) to an accelerated oxygen ageing. The time passing before the occurrence of the first cracks perceptible to the eye is a measure for the antioxidative effect of the added compound.

TABLE A

| Added compound (Stabiliser No.) | Time in hours until cracks form at 140°C |
|---|---|
| without addition | 5 |
| A. Commercial antioxidants | |
| 20 | 25 |
| 21 | 28 |
| 22 | 100 |
| 23 | 260 |
| B. Compounds according to the invention | |
| 1 | 780 |
| 11 | 1030 |
| 17 | 710 |
| 18 | 1220 |

EXAMPLE 4

100 Parts of polypropylene (melt index 3.2) are kneaded in a Brabender plastograph for 10 minutes at 200°C together with the stabilisers listed in the following Tables B and C. A homogeneous dispersion of the stabilisers is thus ensured. The mass obtained in this manner is subsequently pressed in a platen press, at 260°C platen temperature, to form 1 mm thick plates. From the thus obtained plates are cut, with the aid of a microtome, chips having a thickness of 25 μ. These chips are clamped between pieces of stainless steel mesh, and these specimen holders are then suspended in an air-circulation furnace and aged at 135°C or 147°C. Taken as the final point of the test is the point of time at which a light tapping of the stainless steel mesh causes decomposed polypropylene to fall out in powder form (control 1–2 times daily). Results: see Tables B and C.

TABLE B

| Added compound (Stabiliser No.) | Time until decomposition occurs, in hours | |
|---|---|---|
| | at 135° | at 147° |
| without addition | 20 | 10 |
| A. Commercial antioxidants | | |
| 0.2% 20 | 20 | 10 |
| 0.2% 21 | 50 | 20 |
| 0.2% 22 | 120 | 35 |
| B. Compounds according to the invention | | |
| 0.2% 1 | 165 | 65 |
| 0.2% 3 | 165 | 65 |
| 0.2% 10 | 230 | 95 |
| 0.2% 11 | 310 | 120 |
| 0.2% 17 | 380 | 160 |

TABLE C

| Added compound (Stabiliser No.) | Time until decomposition occurs, in hours | |
|---|---|---|
| | at 135° | at 147° |
| 0.1% 20 + 0.3% DLTDP* | 40 | 15 |
| 0.1% 21 + 0.3% " | 60 | 20 |
| 0.1% 22 + 0.3% " | 140 | 48 |
| 0.1% 1 + 0.3% " | 165 | 65 |
| 0.1% 3 + 0.3% " | 240 | 95 |
| 0.1% 10 + 0.3% " | 360 | 130 |
| 0.1% 11 + 0.3% " | 380 | 160 |
| 0.1% 17 + 0.3% " | 380 | 160 |

*dilaurylthiodipropionate

EXAMPLE 5

Stabilisation of low-pressure polyethylene 38 g of low-pressure polyethylene are kneaded together with 0.1% of one of the additives listed in Table D in a Brabender plastograph, whereby the torsional moment produced by the resistance to kneading is continuously recorded. The decomposition of the polymer is indicated by a rapid decrease of the torsional moment after an induction period characteristic for the additive.

TABLE D

| Stabiliser No. | Induction period in min. |
|---|---|
| without addition | 20 |
| 1 | 50 |
| 2 | 40 |
| 10 | 65 |

EXAMPLE 6

Stabilisation of polyamide 6

100 Parts of polyamide 6 granulate are mixed with 0.5 parts of tris-nonylphenylphosphite and 0.5 parts of one of the additives listed in Table E; the mixture is processed in Laborgelimat, a mixing device wherein the composition is melted due to rapid mixing without application of heat, and afterwards pressed at 260°C to form 1 mm thick test plates. The plates are subjected to an air-circulation furnace at 140°C to an accelerated ageing treatment. The stabilising effect of the additives is assessed according to the brittleness of the samples.

TABLE E

| Stabiliser No. | Brittle after: (hours) |
|---|---|
| without addition | 18 |
| 1 | 25 |
| 2 | 34 |
| 3 | 34 |
| 11 | 27 |

EXAMPLE 7

An amount of 100 g of unstabilised Polyamide 12 — granulate ("Vestamid L 1901" from the firm Chem. Werke Huels) is thoroughly mixed with 1.0 g of one of the stabilisers listed in the following Table F; the mixture is processed in a Labor-Gelimat, and then pressed out in a platen press at 260°C to form 1 mm thick test plates. The plates are tested with respect to stability to furnace ageing at 150°C after 2, 5, 10, and 20 days by determination of the viscosity of 0.5% m-cresol solutions. An unstabilised comparison specimen, otherwise processed in an identical manner, is tested along with the stabilised specimens. The relative viscosity values (viscosity of the solution divided by the viscosity of the pure solvent at the same temperature) after the given furnace ageing times are shown in Table F.

TABLE F

| Stabiliser No. | Relative viscosity in m-cresol after furnace ageing at 150°C | | | | |
|---|---|---|---|---|---|
| | after 0 days | after 2 days | after 5 days | after 10 days | after 20 days |
| without addition | 1.81 | 1.60 | 1.48 | 1.43 | 1.40 |
| 20 | 1.85 | 1.63 | 1.49 | 1.42 | 1.40 |
| 21 | 1.84 | 1.64 | 1.51 | 1.42 | 1.42 |
| 22 | 1.84 | 1.61 | 1.50 | 1.41 | 1.40 |
| 2 | 1.85 | 1.85 | 1.79 | 1.63 | 1.54 |
| 3 | 1.83 | 1.84 | 1.75 | 1.59 | 1.49 |
| 9 | 1.83 | 1.87 | 1.85 | 1.62 | 1.54 |
| 10 | 1.86 | 1.90 | 1.84 | 1.76 | 1.60 |
| 11 | 1.84 | 1.89 | 1.82 | 1.70 | 1.56 |
| 19 | 1.84 | 1.86 | 1.86 | 1.68 | 1.55 |

EXAMPLE 8

Stabilisation of synthetic rubber EPDM

Commercial EPDM rubber of the firm Dutch Staatsmjinen is separated from the stabiliser by dissolving in hot toluene and precipitation with methanol. Specimens each weighing 40 g of the dried, stabiliser-free material are kneaded together with 0.2% of one of the additives listed in Table G in a Brabender plastograph, whereby the torsional moment produced by the resistance to kneading is continuously recorded (Table: torsional moment read off direct on the balance in grams). One specimen is tested at the same time with respect to the gel content in each case after 7.15 and 25 minutes (insoluble constituents in hexane). The gel contents increase with progressive ageing, i.e., cross-linking of the polymer.

TABLE G

| Stabiliser No. | Torsional moment in grams after: | | |
|---|---|---|---|
| | 7 min. | 15 min. | 25 min. |
| without addition | 3900 | 3300 | 2600 |
| 10 | 3800 | 3450 | 3400 |
| 11 | 3700 | 3400 | 3300 |
| 17 | 3700 | 3400 | 3400 |

| | Gel content in percent after: | | |
|---|---|---|---|
| | 7 min. | 15 min. | 25 min. |
| without addition | 3 | 20 | 35 |
| 10 | 0 | 0 | 7 |
| 11 | 0 | 0 | 10 |
| 17 | 0 | 0 | 8 |

EXAMPLE 9

Stabilisation of polyurethane 0.25 Parts of the additives given in Table H are in each case dissolved in the cold state in 100 parts of a 25% polyurethane solution (ESTANE 5707 from the firm "Goodrich").

From these solutions are drawn on a glass plate using a film-drawing apparatus ca. 400 $\mu$ thick films, which dry out, after 10 minutes' air-circulation drying at 140°C, to form films having a final thickness of 100 $\mu$. The stabilisers are accordingly present in the films in a concentration of 10%. Specimens of these films are exposed on a white cardboard background in a Xenotest apparatus until the occurrence of a visually perceptible yellowing.

TABLE H

| Stabiliser No. | Exposure time in hours until yellowing clearly occurs |
|---|---|
| without addition | 150 |
| 25 | 250–300 |
| 2 | 300 |
| 2 + 25 | 600 |
| 9 | 300 |
| 9 + 25 | 500–600 |
| 11 | 300 |
| 11 + 25 | 500–600 |
| 19 | 350 |
| 19 + 25 | 600 |

EXAMPLE 10

Elastomer fibres of a linear polyurethane (Enkaswing S5A of Fa. AKU, Holland) are spun from a 20% dimethylacetamide solution, and the fibres precipitated in a toluene bath. To the precipitation bath are added:

1.5 % of Stabiliser No. 10,
1.5 % of 2-(2'-hydroxy-3',5'-di-tert.butylphenyl)-5-chlorobenzotriazole,
1.5 % of dilaurylthiodipropionate,
2.0 % of ethylenediamine,
2.0 % of silicone oil.

Used as comparison specimen is a fibre produced in a similar manner but without addition of the antioxidant according to the invention to the precipitation bath.

Both fibre specimens are artificially aged for 15 hours at 105°C in a drying cupboard, whereby it is observed that the unstabilised fibre clearly yellows, whereas the stabilised fibre exhibits no sign of yellowing.

EXAMPLE 11

Stabilisation of polyacetal

100 Parts of an unstabilised homo-polyacetal (polyformaldehyde, origin: : Societa Italiana Resine) are mixed with 1.5 parts of calcium stearate and 0.2 parts of one of the additives listed in Table I; the mixture is then processed for 15 minutes on a two-roller mill, and the rolled sheet drawn off. An amount in each case of 10 mg of the stabilised specimens is heated on the pan of a sensitive thermo-balance to 220°C. The loss in weight (in per cent) of the specimens is continuously recorded.

TABLE I

| Stabiliser No. | Loss in weight in % after: | | |
| --- | --- | --- | --- |
| | 5 min. | 10 min. | 15 min. |
| without addition | 12 | 22 | 31 |
| 1 | 3 | 9 | 13 |
| 10 | 5 | 12 | 17 |
| 11 | 4 | 10 | 15 |
| 17 | 7 | 12 | 19 |

EXAMPLE 12

Stabilisation of polymethylmethacrylate

100 Parts of polymethylmethacrylate ("Resarit 400") are intensively mixed with 1.5 parts of one of the additives listed in the following Table K. The obtained mixture is extruded in a laboratory extruder, and subsequently granulated. The obtained granulate is afterwards regranulated a further 25 times. After the fifth, 15th and 25th extrusion, a specimen of the granulate is pressed to form a 1 mm thick plate, which is assessed with respect to its colour.

TABLE K

| Additive No. | Colour of the synthetic material after: | | |
| --- | --- | --- | --- |
| | 5 extrusions | 15 extrusions | 25 extrusions |
| without addition | yellow | deep yellow | brown |
| 1 | colourless | colourless | faintly yellow |
| 17 | colourless | colourless | faintly yellow |
| 18 | colourless | colourless | faintly yellow |
| 19 | colourless | colourless | faintly yellow |

We claim:

1. A composition of matter consisting essentially of an organic material subject to oxidative decomposition and from 0.01 to 5% by weight of the organic material of a stabilizer having the formula

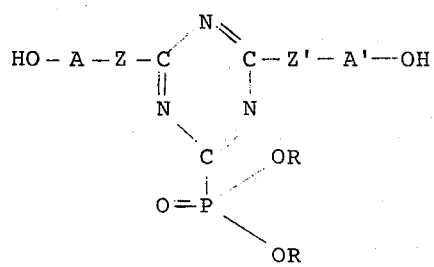

wherein A and A' are identical or different and represent an unsubstituted or substituted phenylene radical which is bound in position 1 to Z or Z' and carries in position 4 a hydroxyl group; Z and Z' are identical or different and represent a bridging member —O—, —S— or —NQ—, with Q standing for hydrogen, alkyl, alkoxy, or —CN; R and R' are identical or different and represent an unsubstituted or substituted alkyl, cycloalkyl or phenyl radical.

2. A composition of claim 1 wherein said organic material is poly-α-olefin.

3. A composition of claim 2 wherein said polyolefin is polypropylene.

4. A composition of claim 3 wherein the stabilizer is the compound having the formula

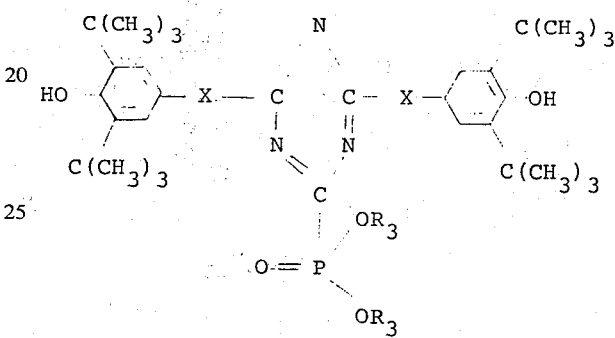

wherein $R_3$ represents an alkyl group having 1 to 18 carbon atoms, or a phenyl group; and X represents a bridging member —O— or —NH—.

5. A omposition of claim 3 wherein the stabilizer is the compound having the formula

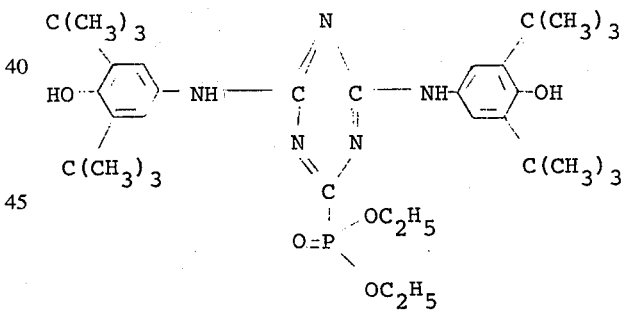

6. A composition of claim 3 wherein the stabilizer is the compound having the formula

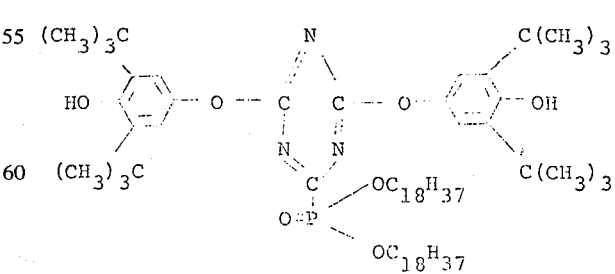

7. A composition of claim 13 wherein the stabilizer is the compound having the formula

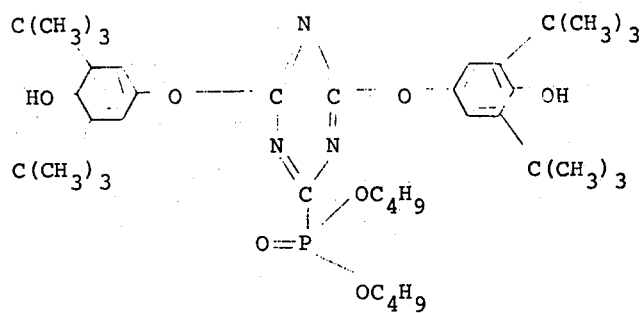

8. A composition of claim 3 wherein the stabilizer is the compound having the formula

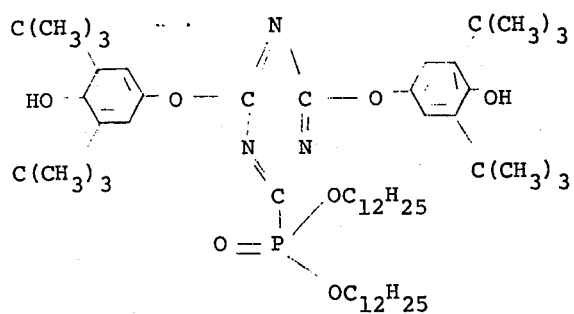

9. A composition of claim 3 wherein the stabilizer is the compound having the formula

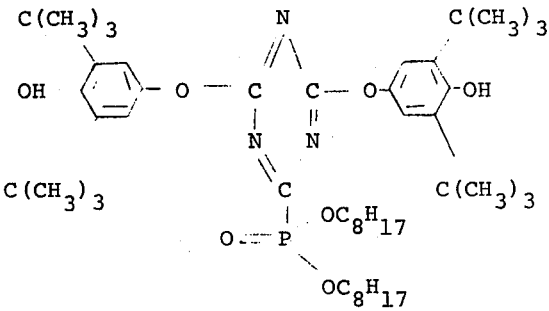

10. A composition of claim 1 wherein said organic material is selected from the group consisting of polyamide, polyurethane, ethylene propyline-diene monomer rubber, polyacetal and polymethylmethacrylate.

* * * * *

UNITED STATES PATENT AND TRADEMARK OFFICE
CERTIFICATE OF CORRECTION

PATENT NO. : 3,900,443
DATED : August 19, 1975
INVENTOR(S) : Christian Luethi, et al It is certified that error appears in the above-identified patent and that said Letters Patent are hereby corrected as shown below:

Cover page, [73] Assignee, should read
-- CIBA-GEIGY AG, Basle, Switzerland --.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks